United States Patent
Ebeling et al.

(10) Patent No.: US 9,041,360 B2
(45) Date of Patent: May 26, 2015

(54) WIRELESS SELF-SUFFICIENT MONITORING SYSTEM FOR A DOOR LOCK MECHANISM

(75) Inventors: Stefan Ebeling, Wilhelmshaven (DE); Lars Rowold, Varel (DE); Michael Pope, Fredenbeck (DE)

(73) Assignee: Airbus Operations GmbH (DE)

( * ) Notice: Subject to any disclaimer, the term of this patent is extended or adjusted under 35 U.S.C. 154(b) by 565 days.

(21) Appl. No.: 13/144,218

(22) PCT Filed: Jan. 13, 2010

(86) PCT No.: PCT/EP2010/050332
§ 371 (c)(1),
(2), (4) Date: Oct. 6, 2011

(87) PCT Pub. No.: WO2010/081816
PCT Pub. Date: Jul. 22, 2010

(65) Prior Publication Data
US 2012/0062184 A1 Mar. 15, 2012

Related U.S. Application Data

(60) Provisional application No. 61/205,340, filed on Jan. 16, 2009.

(30) Foreign Application Priority Data

Jan. 16, 2009 (DE) .......................... 10 2009 004 835

(51) Int. Cl.
*H02J 7/00* (2006.01)
*E05C 3/12* (2006.01)
*B64C 1/14* (2006.01)

(52) U.S. Cl.
CPC ................ *E05C 3/12* (2013.01); *B64C 1/1407* (2013.01)

(58) Field of Classification Search
USPC .......................................................... 320/166
See application file for complete search history.

(56) References Cited

U.S. PATENT DOCUMENTS

| 6,108,976 A * | 8/2000 | Kato et al. .................... 49/360 |
| 6,834,834 B2 | 12/2004 | Dazet et al. |
| 2002/0060270 A1 * | 5/2002 | Buchs et al. ................ 244/129.5 |
| 2004/0148088 A1 * | 7/2004 | Davis et al. ................... 701/123 |
| 2004/0212195 A1 | 10/2004 | Marek et al. |
| 2004/0222638 A1 | 11/2004 | Bednyak |
| 2008/0018308 A1 * | 1/2008 | Daboussi ...................... 320/167 |
| 2008/0210823 A1 | 9/2008 | Toboso et al. |

FOREIGN PATENT DOCUMENTS

| DE | 28 13 029 A1 | 9/1979 |
| DE | 199 29 341 A1 | 12/2000 |
| DE | 100 37 260 C2 | 7/2002 |
| EP | 1227034 A1 | 7/2002 |
| EP | 1907654 A2 | 4/2008 |
| GB | 2438548 A | 11/2007 |
| WO | 2007/012774 A2 | 2/2007 |
| WO | 2007/027702 A2 | 3/2007 |

OTHER PUBLICATIONS

German Office Action dated Nov. 25, 2014.

* cited by examiner

*Primary Examiner* — Arun Williams
(74) *Attorney, Agent, or Firm* — Lerner, David, Littenberg, Krumholz & Mentlik, LLP

(57) ABSTRACT

The invention relates to a monitoring system for monitoring a state of a door lock mechanism of a door or of a closure of a storage space of a means of transportation, comprising a generator and a sensor/actuator. The generator produces electrical energy from vibration energy, and the sensor detects the state of the door lock mechanism. The sensor uses the kinetic energy that is produced by the actuation of the door lock to generate an electrical signal, which is then transmitted to a microcontroller.

12 Claims, 4 Drawing Sheets

WIRELESS SELF-SUFFICIENT MONITORING SYSTEM FOR A DOOR LOCK MECHANISM

CROSS-REFERENCE TO RELATED APPLICATIONS

This application is a national phase entry under 35 U.S.C. §371 of International Application No. PCT/EP2010/050332, filed Jan. 13, 2010, published in German, which claims the benefit of the filing date of U.S. Provisional Patent Application No. 61/205,340, filed Jan. 16, 2009, and of German Patent Application No. 10 2009 004 835.9, filed Jan. 16, 2009, the entire disclosures of which are hereby incorporated herein by reference.

FIELD OF THE INVENTION

The invention relates to monitoring door locks in transport means and stowage spaces, or doors of any kind. In particular, the invention relates to a monitoring system for a door locking mechanism for the door of a means of transportation, a transport means with a door having a door locking mechanism and such a monitoring system, the use of a monitoring system in an aircraft, as well as a method for monitoring a door locking mechanism.

TECHNOLOGICAL BACKGROUND

Known locking mechanisms for aircraft doors exhibit a T-shaped handle, which can be moved from a locked position to an unlocked position by rotating it around a pivoting axis. Typical rotational angles measure 65 degrees.

These T-shaped handles are secured to many doors inside of aircraft. For example, the car door (cage door) of the so-called trolley lift conveyance system of the A 380 and A 340-600 exhibits such a handle. The so-called "trunk door" (outside door) is directly adjacent thereto.

If the T-shaped handle is in the open position, meaning folded up, the trunk door is not allowed to close, since the handle prevents this from happening.

The handle position is monitored optically or in part even mechanically, since the trunk door cannot be closed with the handle in the unlocked position. Another spacer located on the inside of the trunk door enhances this mechanical protection, preventing the outside door (trunk door) from closing when the inside door (cage door) is open.

However, damage may in this case be done to the door if excessive forces are applied, and the T-shaped handle presses too hard against the outside door, thereby defeating the mechanical protection.

EP 1 907 654 A2 and U.S. 2008/0210823 A1 show controllers for locking and unlocking aircraft doors, which exhibit several mechanical elements.

SUMMARY OF THE INVENTION

An object of the invention is to indicate an improved way of monitoring a door locking mechanism for the door of a transport means.

Indicated herein is a monitoring system for a door locking mechanism for the door of a transport means, a stowage space, a transport means with a monitoring system, the use of a monitoring system in an aircraft, as well as a method according to the features in the independent claims. Further developments of the invention can be gleaned from the subclaims.

The described exemplary embodiments apply equally to the monitoring system, transport means, use and method. In other words, the features mentioned below, for example in relation to the monitoring system, are simultaneously also implemented in the method, and vice versa.

One exemplary embodiment of the invention indicates a monitoring system for a door locking mechanism for the door of a transport means, or generally a stowage space, wherein the monitoring system exhibits a generator and a sensor. The generator is designed to produce electrical energy from vibration or kinetic energy for operating the monitoring system, and the sensor is designed to detect a state of the door locking mechanism and generating (e.g., inductively or capacitively) an electrical signal that serves to describe the current state.

The electric energy may, alternatively or additionally to its production from vibrational or kinetic energy, also be produced from light (solar energy).

Therefore, the monitoring system involves an electrical or electronic system whose operation requires electrical energy, which is supplied to the control unit (microchip). This electrical energy is obtained from vibration energy by means of the generator. Other energy sources are not required. In addition, at least a portion of the energy can be derived from moving the handle of the door locking mechanism.

In another exemplary embodiment of the invention, the vibration energy stems from a vibration of the transport means, wherein the generator exhibits suitable frequency converters for generating the electrical energy.

Electrical energy can also be generated if the handle (actuator) is moved, e.g., is switched from the locked position to the unlocked position. This serves to recognize the state of the closing mechanism and initiate the message transfer to the control unit.

In another exemplary embodiment of the invention, the monitoring system also exhibits an energy management unit for controlling a constant output voltage for a microcontroller (µ-controller). In this way, the variable voltage generated by the vibration generator can be brought to a desired, constant value.

In addition, the energy management unit is used for the efficient utilization of energy.

The energy management unit ensures that the µ-controller is always supplied with the desired power, for example independently of the vibrating strength of the transport means or the generator power.

In another exemplary embodiment of the invention, the energy management unit exhibits an energy storage device for storing at least a portion of the electrical energy for operating the monitoring system.

Therefore, the excess energy produced by the generator is temporarily stored in the energy storage device, and when needed can be relayed to the µ-controller or sensor/actuator, or also to a transceiver for transferring information.

In another exemplary embodiment of the invention, the energy storage device exhibits a capacitor. Involved here, for example, is a dual-layer capacitor like a Goldcap, Supercap, Boostcap or Ultracap capacitor.

Naturally, the energy storage device may also exhibit an accumulator (additionally or alternatively to the capacitor).

In another exemplary embodiment of the invention, the sensor/actuator is designed to convert a compressive/motive force into an electrical signal. This can be a piezoelectric, electromagnetic or electrocapacitive sensor/actuator. If pressure/force is applied to the door locking mechanism, for example on a corresponding handle of the mechanism, the sensor detects this pressure/force, and the detected data may be used to determine whether the door locking mechanism is closed or open. An optical/inductive sensor can also be provided, which detects the position of the handle. The sensor can also be designed to detect the rotational position of the handle of the locking mechanism, for example by attaching it on or near the rotational axis of the handle.

The invention makes it possible to conditionally modify the handle in such a way as to eliminate the need for a rotational position.

In another exemplary embodiment of the invention, the door is the cabin door of a passenger aircraft. It can also be another door or flap (closure) of a stowage space in a passenger aircraft.

According to another exemplary embodiment of the invention, the monitoring system is designed for energy autonomous, i.e. self-sufficient, operation. Energy autonomous operation means that no other energy has to be provided to the monitoring system than the vibration energy in order to provide for proper, regular operation of the system.

In another exemplary embodiment of the invention, the monitoring system further exhibits a microcontroller (μ-controller) and a transceiver. The μ-controller is coupled to the sensor, and receives a measuring signal from the sensor that corresponds with the state of the door locking mechanism. The transceiver is used for wirelessly transmitting a signal from the μ-controller that corresponds with the measuring signal. The transmission takes place from the transceiver to an external control unit.

In another exemplary embodiment of the invention, the control unit is a controller for a trolley lift.

In another exemplary embodiment of the invention, the monitoring system also exhibits a display that shows the state of the door locking mechanism. This makes it easy to read the current state of the door locking mechanism without having to optically monitor the mechanism.

Another exemplary embodiment of the invention indicates a transport means having a door with a locking mechanism, as well as a monitoring system described above and below.

For example, the transport means is an aircraft, in particular a passenger aircraft, or some other transport means, such as a water craft, rail vehicle or surface vehicle.

Another exemplary embodiment of the invention indicates the use of such a monitoring system in an aircraft.

Another exemplary embodiment of the invention indicates a method for monitoring a door locking mechanism of a door or flap for the stowage space of a transport means, in which electrical energy is generated out of vibration and kinetic energy (produced by activating the handle) for operating a monitoring system, after which a state of the door locking mechanism is detected by a sensor of the monitoring system. The state of the closing mechanism is automatically sent to the control unit at the point of activation.

Storing energy in the buffer makes it possible to retrieve the state of the closing mechanism at any time. This helps to increase system reliability and safety, which can be guaranteed as a result.

Exemplary embodiments the invention will be described below drawing reference to the figures.

DETAILED DESCRIPTION OF EXEMPLARY EMBODIMENTS

The depictions on the figures are schematic and not to scale.

The following description of figures uses the same reference numbers for identical or similar elements.

Figure 1:
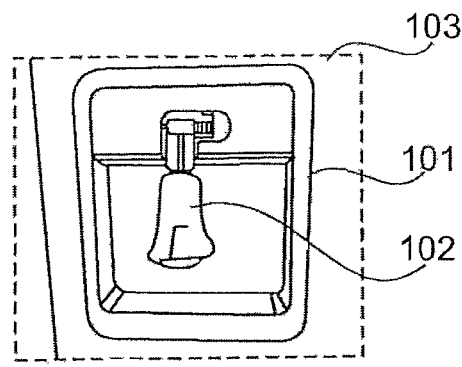
FIG. 1 shows a door locking mechanism.

FIG. 1 shows a T-shaped handle 102 of a door locking mechanism 101 of a door 103. The handle is operated by the finger of a user, who rotates it upward by about 65 degrees. To this end, the handle is trapezoidal.

Figure 2:
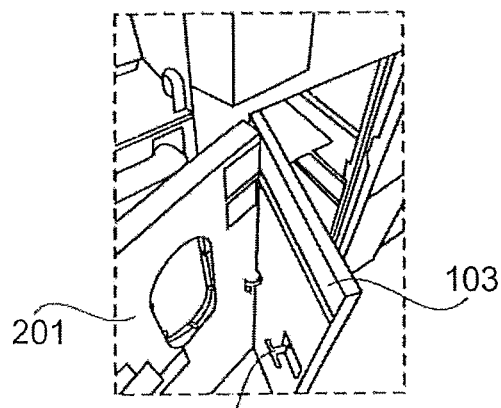
FIG. 2 shows an inside and outside door of an aircraft.

FIG. 2 shows the door 103 on FIG. 1 with the handle 102, which is in the unlocked position, meaning folded up. The T-shaped handle 102 of the cage door (inside door) is folded up so that the outside trunk door (outside door) 201 cannot be closed when the cage door (inside door) is open, meaning unlocked.

In this case, the handle 102 mechanically prevents the trunk door 201 from closing by hitting the trunk door and thus not allowing it to be closed.

Figure 3:
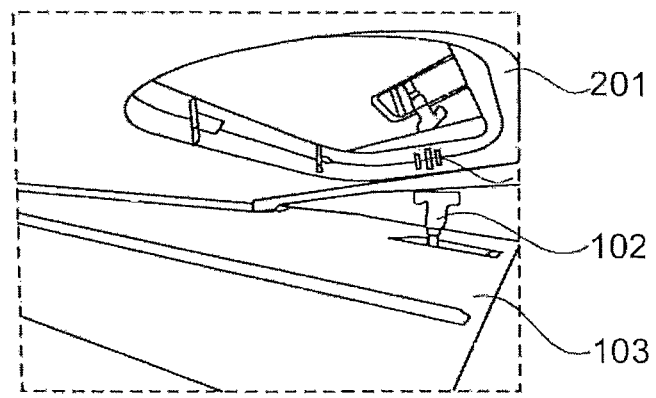
FIG. 3 shows an inside and outside door of an aircraft.

FIG. 3 also shows the situation in which the cage door (inside door) 103 is unlocked, in which the T-shaped handle 102 presses against the trunk door 201, thereby preventing the trunk door from closing.

Figure 4:
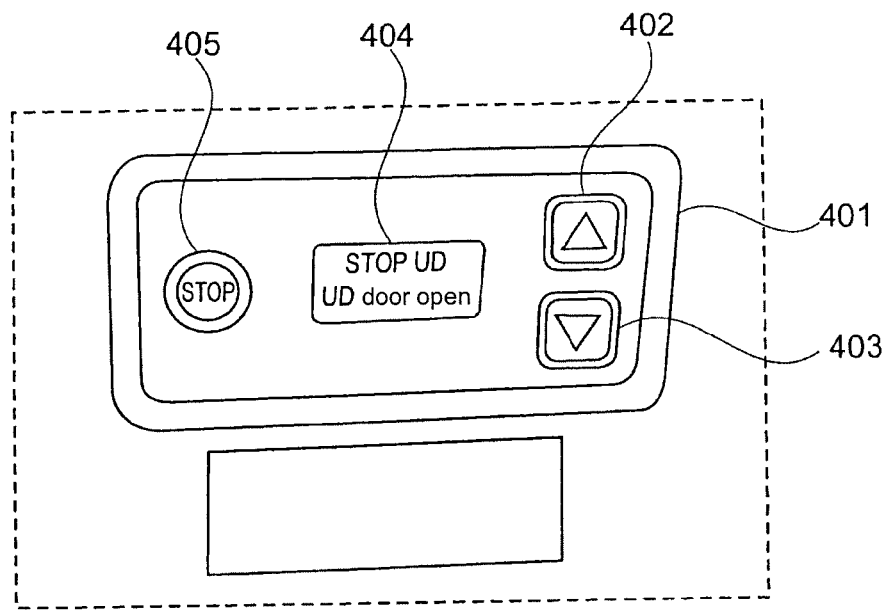
FIG. 4 shows an operation panel display.

FIG. 4 shows an operation panel display ("operation panel display") for displaying information, which is designed as an HMI (human machine interface) or maintenance display. For example, the operation panel display is mounted on the system so that it can also optically monitor control commands and displays.

When the trunk door is closed, but the cage door is still open, the system might respond as follows: The lift system switches to vehicle operation, given the absence of an electrical monitor. If the engine and speed monitor of the system results in an "Inop" (inoperable) state, meaning inoperable, the following information is shown on display 404 of the operation panel display 401 if the error arises in the "upper deck" (UD) of the transport means: "Stop UD; UD Door Open". This stems from the deformation of the UD outside door (trunk door) due to pressure on the inside initiated by the inside door (cage door), which is not closed. Also provided is a stop key 405, located to the left of the display 404. Additionally provided is an up key 402 and down key 403 for moving the lift.

Since the trunk door of the upper deck (upper deck, UD) is closed, while the cage door (inside door) is open, the lift system reports an error (FAULT) with the message "UD Door Open", since the trunk door was bent by the open cage door (inside door). This bend was detected by the corresponding door sensor of the trunk door. The corresponding sensor signal in this case reads "door open". The control unit interprets this as an impossible state and switches to the "FAULT" state, Open door "while the lift is going down" is not a permitted state.

In the event of a "FAULT", the display 404 reads as follows: "FAULT, Push Stop 2× to Reset". This means that the user has pressed the Stop key 405 twice to reinitialize the lift system. The "FAULT" message on the display was then cleared, but the door was still open. This is why the lift system is inoperable. The reason is because the trunk door is electrically monitored. The system recognizes the state of the outside door, but not the state of the inside door.

The T-shaped handle of the lift cabin pressed against the space inside the trunk door, thereby deforming the trunk door.

Figure 5:
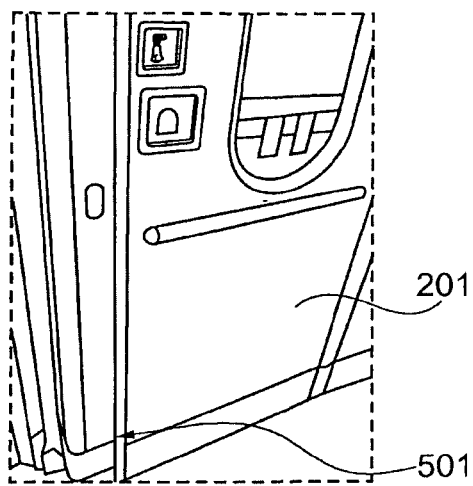
FIG. 5 shows a closed, damaged door.

The deformation of the trunk is depicted on FIG. 5, see reference number 501.

This is prevented by using a monitoring system according to the invention.

Figure 6:
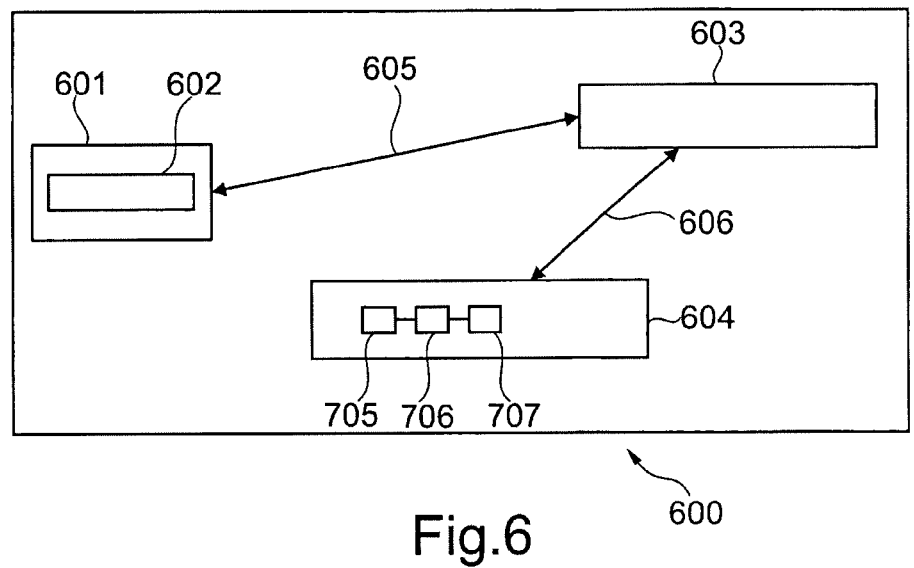
FIG. 6 shows a monitoring system according to an exemplary embodiment of the invention.

FIG. 6 shows a monitoring system 600 according to an exemplary embodiment of the invention. The monitoring system 600 exhibits an operation panel 601 (which can correspond to the operation panel 401 on FIG. 4) with a display 602 and possibly several control knobs. Also provided is a so-called trolley lift controller 603, meaning a control unit. The control unit 603 is connected with the operation panel 601, either wirelessly or by way of an already existing cable connection.

In addition, the monitoring system exhibits a door locking mechanism 604, which aside from the mechanism also has a generator 705, an energy management unit 706 and a peripheral unit 707.

The door locking mechanism 604 is coupled with the controller 603 for purposes of exchanging information, e.g., by way of a wireless communications link.

The energy for supplying the peripheral devices (sensors, transceiver) of the monitoring system is generated by converting mechanical vibration/kinetic energy into electrical energy.

This makes it possible to wirelessly monitor all relevant states of the door locking mechanism in an intelligent and energy autonomous manner. The detected monitoring data are then radioed to the controller for the trolley lift by remote control. The controller 603 exhibits a radio receiver for receiving the measuring data and, if needed, sending control data from/to the door locking mechanism 604.

The display 602 of the operation panel 601 indicates the state of the door locking mechanism. Since the power management unit 706 has an energy storage device, proper operation of the monitoring system is ensured at all times.

Figure 7:
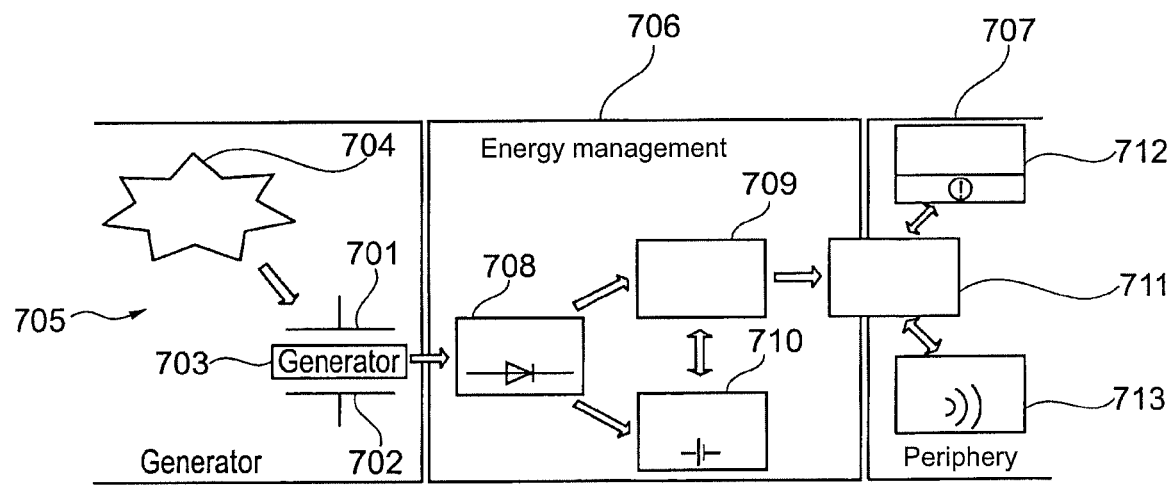
FIG. 7 shows part of such a monitoring system according to an exemplary embodiment of the invention as a block diagram.

FIG. 7 shows the components 705, 706 and 707 of the monitoring system.

The sensor/actuator 712 will be described below:

For example, the sensor/actuator 712 has an inductive design, and to this end exhibits a permanent magnet, for example, with an inductance between its two poles. The energy converted in the sensor 712 arises from the mechanical motion of the locking mechanism.

The sensor can also be realized with electrodynamic, capacitive or Hall sensors.

The generator 705 can also be designed in a similar way (see magnetic poles 701, 702 and inductance 703).

The generator 705 contains one or more frequency converters in order to generate electrical energy out of mechanical vibration energy.

The generated electrical energy is then relayed to the energy management unit 706, where it is converted into direct current by an electrical rectifier 708, for example. After this, a portion of the generated energy is passed on to a voltage controller 709, which supplies the µ-controller 711 with a suitable voltage. Another portion of the generated energy is relayed to the energy storage unit 710, where it is temporarily stored, and later fed to the voltage controller 709 and then to the µ-controller should additional energy be required.

The microprocessor 711 communicates with the sensor/actuator 712 for detecting the state of the door locking mechanism. In addition, the µ-controller 711 communicates with the transceiver 713 for communicating with the controller 603.

For example, the sensor/actuator 712 is a piezoelectric sensor. Exerting a pressure on the lever of the door locking mechanism converts this mechanical compressive force into electrical energy. The state of the door locking mechanism can be derived from the resultant signal. This information can then be automatically sent to the lift system or lift system controller.

In addition, the induction current generated by moving the handle can be detected. In this way, the movement of the handle can be tracked by evaluating the induction current. Electrodynamic generators or Hall sensors or capacitive sensors can here also be used.

This provides a monitor for the door lock that makes do with comparatively little energy. Despite the autonomous energy supply, the door locking mechanism can be continuously monitored, and a signal can be immediately transmitted to a corresponding controller 603.

Therefore, the monitoring system enables a continuous monitoring, is cost-effective, very reliable, easy to install, and requires only a slight maintenance outlay. In addition, no cable connections and batteries are required.

Since cables and batteries are hence unnecessary, it becomes possible to furnish additional space for integrating the sensor/actuator into areas previously not usable for this purpose. In addition, in particular moving assemblies are not cabled, thereby reducing the vulnerability to failures even further.

In particular, a spacer is also no longer required to mechanically prevent the outside door from closing with the inside door open.

Figure 8:
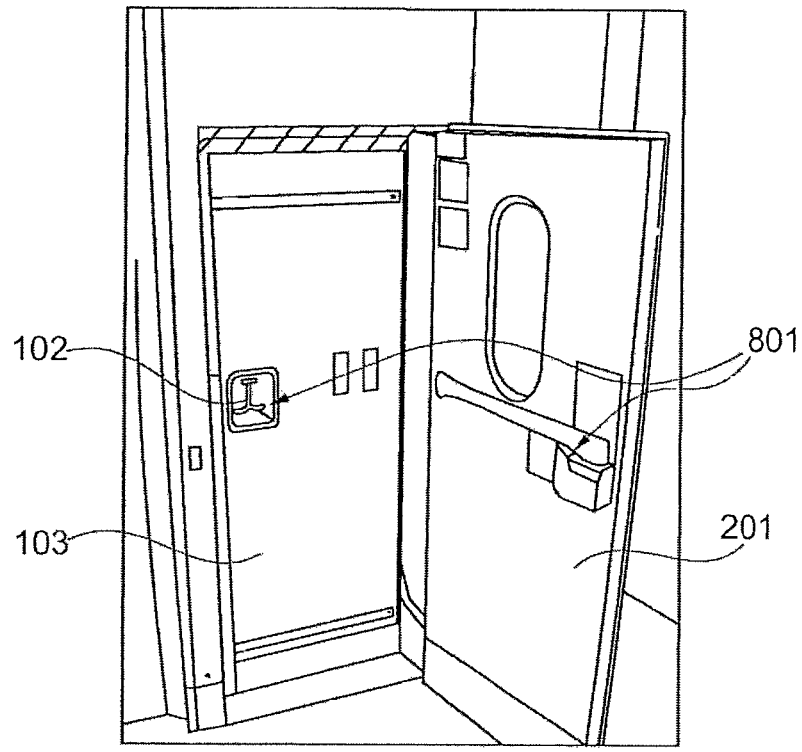
FIG. 8 shows two aircraft doors with a monitoring system according to an exemplary embodiment of the invention.

FIG. 8 depicts such a monitoring system, which is incorporated into the doors of an aircraft (see reference number 801).

No part of the monitoring system is built into the door 201. The originally provided spacer is no longer needed (resulting in lower weight and costs). The inside door lock 102 is modified. The cage door itself is not further modified.

One objective of the invention is to ensure a simple installation. For this reason, the system according to the invention is configured as a single unit, which can be installed, expanded and serviced without special tools. This significantly reduces the time required for installation and maintenance.

The "failsafe" technique (which refers to continuous state monitoring) significantly increases the MTBF (i.e., the mean time between failures) or decreases the MTBUM (i.e., mean time between unscheduled maintenance).

Figure 9:
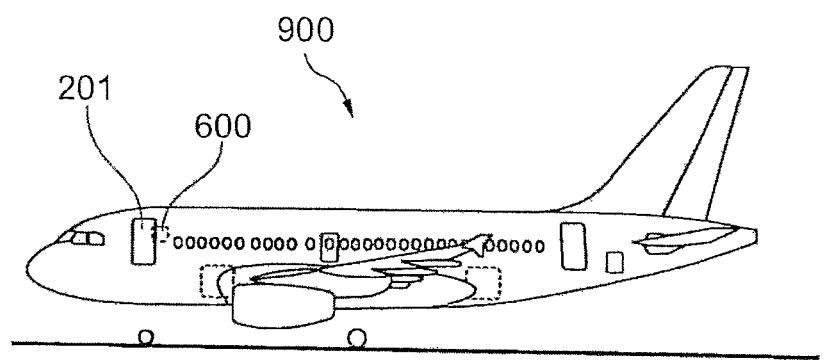
FIG. 9 shows an aircraft according to an exemplary embodiment of the invention.

FIG. 9 shows an aircraft 900 with a door 201 and monitoring system 600. It must be noted that the door 201 on FIG. 1 to 5 is located in the cladding of the lift system, and comprises the interface to the cabin of the aircraft. Such a door is not depicted on FIG. 9.

The monitoring system can be built into any transport means (rail, air, road) and into any door or flap lock.

In addition, it should be noted that "exhibit" "comprise" or "encompass" do not preclude an other elements or steps, and that "a" or "the" do not rule out a plurality. Let it further be noted that features or steps described with reference to one of the above exemplary embodiments can also be described in combination with other features or steps from other exemplary embodiments described above. Reference numbers in the claims must not be construed as a limitation.

The invention claimed is:

1. A monitoring system for a door locking mechanism of a door of a transport means, wherein the monitoring system comprises:
   a generator for generating electrical energy out of vibration energy for operating the monitoring system; and
   a sensor for detecting a pressure applied to a handle of the door locking mechanism, for converting the pressure into an electrical signal describing a current state of the door locking mechanism and for automatically sending the electrical signal to a controller, wherein the monitoring system is configured for energy autonomous operation.

2. The monitoring system of claim 1, wherein the vibration energy stems from a vibration of the transport means; and
   wherein the generator comprises frequency converters for generating the electrical energy from vibration.

3. The monitoring system of claim 1, further comprising:
   an energy management unit for controlling an output voltage for a processor.

4. The monitoring system of claim 3, wherein the energy management unit comprises an energy storage device for storing at least a portion of the electrical energy for operating the monitoring system.

5. The monitoring system of claim 4, wherein the energy storage device comprises a capacitor.

6. The monitoring system of claim 1, wherein the door is a cage door of a passenger aircraft.

7. The monitoring system of claim 1, further comprising:
   a microprocessor, coupled to the sensor and receiving a measuring signal from the sensor corresponding to the state of the door locking mechanism; and
   a transceiver for wirelessly transmitting a signal corresponding to the measuring signal from the microprocessor to a control unit.

8. The monitoring system of claim 7, wherein the control unit is a controller for a trolley lift.

9. The monitoring system of claim 1, further comprising:
   a display for indicating the state of the door locking mechanism.

10. A transport means with a door having a door locking mechanism and a monitoring system wherein the monitoring system comprises:
    a generator for generating electrical energy out of vibration energy for operating the monitoring system; and
    a sensor for detecting a pressure applied to a handle of the door locking mechanism, for converting the pressure into an electrical signal describing a current state of the door locking mechanism and for automatically sending the electrical signal to a controller, wherein the monitoring system is configured for energy autonomous operation.

11. The transport means of claim 10, wherein the transport means comprises an aircraft.

12. A method for monitoring a door locking mechanism of a door of a transport means, wherein the method comprises:
    generating electrical energy from vibration-kinetic energy for operating a monitoring system; and
    via a sensor of the monitoring system, detecting a pressure applied to a handle of the door locking mechanism, converting the pressure into an electrical signal describing a current state of the door locking mechanism and automatically sending the electrical signal to a controller.

* * * * *